A. N. COULSON.
DIMMING MECHANISM FOR AUTOMOBILE LIGHTS.
APPLICATION FILED APR. 7, 1919.
1,395,907.
Patented Nov. 1, 1921.
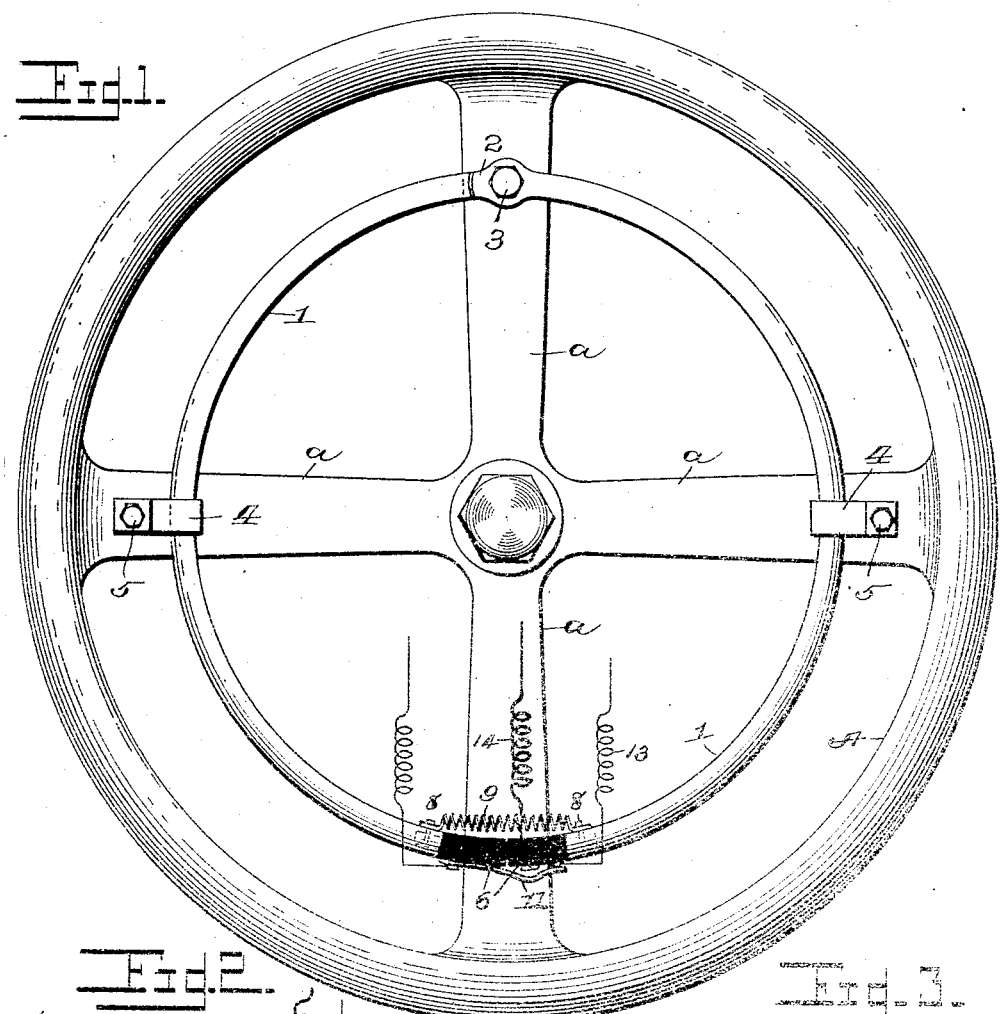
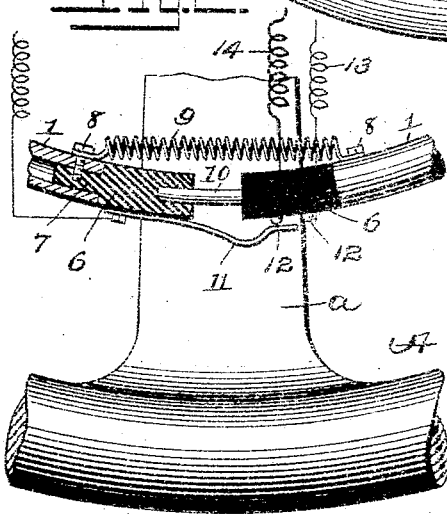
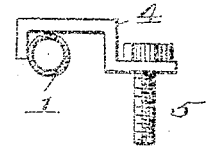
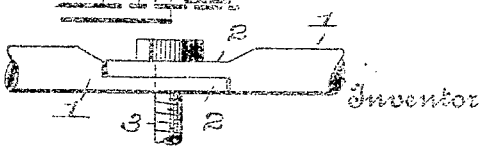
Inventor
Attorney

UNITED STATES PATENT OFFICE.

ALBERT N. COULSON, OF BALTIMORE, MARYLAND.

DIMMING MECHANISM FOR AUTOMOBILE-LIGHTS.

1,395,907. Specification of Letters Patent. Patented Nov. 1, 1921.

Application filed April 7, 1919. Serial No. 288,400.

(FILED UNDER THE ACT OF MARCH 3, 1883, 22 STAT. L., 625.)

*To all whom it may concern:*

Be it known that I, ALBERT N. COULSON, chief clerk, auditing department, construction division, War Department, a citizen of the United States, stationed at Camp Hola-bird, Baltimore, Maryland, have invented an Improvement in Dimming Mechanism for Automobile-Lights, of which the following is a specification.

The invention described herein may be used by the Government, or any of its officers or employees in prosecution of work for the Government, or by any other person in the United States, without payment of any royalty thereon.

As is well known, many accidents have resulted from the blinding glare of high power electric lamps of automobiles, and, in many jurisdictions of this country, there are laws requiring the use of dimmers.

The present invention relates to such dimming devices for regulating the electric lights of automobiles, motor boats, motor propelled aeroplanes, dirigible balloons, and other vehicles and machines.

The object is to produce a dimming device of the kind described which is of simple and economical construction, which is readily and easily applied to any motor vehicle construction, or the like, and which is preferably supported in position conveniently located with reference to the steering wheel and to the usual engine-controlling members located thereon, to enable the operator to control the dimmer without moving his hands from the steering wheel.

With these objects in view, my invention resides, generally stated, in a dimming device embodying circuit-closing or switch mechanism for controlling the electric circuit of the lighting system, so as to cut into the circuit a resistance to vary the current to said lamps, thereby dimming the latter.

More specifically stated, the invention resides in a light-dimming mechanism comprising arcuate members collectively forming a split ring concentric with the rim of the steering wheel and adapted to be grasped at any point, irrespective of the position of the steering wheel, for cutting a resistance into the electric light circuit to the lamps.

The invention is graphically illustrated in the accompanying drawing, which shows an exemplary embodiment of the underlying principles thereof. Like reference characters designate corresponding parts throughout the several views, which may be briefly described as follows:—

Figure 1 is a top plan view of a steering wheel with my novel mechanism applied thereto showing the normal position of the parts thereof:

Fig. 2 is a fragmentary view, partly in section, of the steering wheel and the light-dimming mechanism, showing the position of the parts of the latter when the resistance has been cut into the circuit;

Fig. 3 is a detached detail view of one of the brackets for the ring members of the switch mechanism; and Fig. 4 is a fragmentary detail view of the ring members with their hinge or pivot.

Referring, now, in detail to the drawing:—

A designates the rim of a steering wheel provided with the spokes *a*.

1, 1 designate arcuate members or ring-sections, preferably tubular, collectively forming a split ring concentric with the rim A of the steering wheel. Each of these members may be provided with a lip or tongue 2, at one end thereof, which lips are superposed when the ring members are placed end to end. Through the superposed lips passes a pivot or hinge pin 3, which conveniently may be a screw, as shown, and which may be secured to one of the spokes *a*. Desirably, the hinge is so located as to be farthest from the operator when the steering wheel is in neutral position.

Brackets 4, 4 may be secured in any suitable manner, as by screws 5—5, to two of the spokes *a*, *a*. The brackets arch over the members 1, 1, as shown in Figs. 1 and 3, and serve to limit movement of said members on their pivot or hinge 3.

In the ends of the members 1, 1, opposite the hinge 3, are inserted plugs 6, 6, of insulating material, and preferably such plugs are annular in cross section, and they may be each provided with a reduced portion or neck 7, of a diameter to fit the bore of the ring members 1, 1, so that said necks may be inserted in said ring members, as shown in Fig. 2.

Screws 8, passing through the ring sections and into the necks 7, of the insulating plugs 6, prevent accidental displacement of said plugs. Said screws also serve the function of securing means for the ends of a retractile spring 9, which automatically returns the members 1, 1, to normal position after they have been separated, as shown in Fig. 2.

A rod 10, seated in sockets in the adjacent ends of the plugs 6, 6, serve to maintain the ends of the ring sections 1, 1, in alinement when they are separated.

Carried by one of the plugs 6, is a leaf spring 11, the free end of which is adapted to bear upon one or the other of stationary electrical contacts 12, 12, carried by the other plug 6. Leading from one of the electric contacts 12, is an electric conductor 13, of the electric circuit to the lamps. Leading from the other contact 12 is an electric conductor 14 of another circuit to the lamps. This conductor 14, includes a resistance (not shown).

In operation, when it is desired to dim the lamps, a slight pull at any point on either of the ring sections 1, 1, will cause the plug ends thereof to separate and the leaf spring 11 to move from the position thereof shown in Fig. 1 to the position shown in Fig. 2, thus cutting in the resistance. The leaf spring 11, in moving from one contact 12 to another will remain in engagement with the first contact until it touches the second contact, thus avoiding any interval, however short, in which the head lamps of the motor vehicle would fail to show a light.

Having thus fully described my invention, what I claim as new and desire to secure by Letters Patent is:—

1. In a switch or controller, pivoted ring sections and switch contacts carried by said sections, said contacts operating to control a circuit by movement of said ring sections about their pivoted connections.

2. In a switch, hinged arcuate sections, contacts carried by one of the sections near its end, a contact carried by the other section and adapted for selective engagement with the first contacts and means for normally drawing the ends of the sections together.

3. In a switch, hinged arcuate sections having abutting ends, insulating plugs secured in the ends, spaced contacts secured in one of the plugs, a contact secured in the other plug and adapted for selective engagement with the first contacts and means for drawing the ends into engagement.

4. In a switch, hinged arcuate sections having abutting ends, insulating plugs secured in the ends, spaced contacts secured in one of the plugs, a contact secured to the other plug and adapted for selective engagement with the first contacts, means for drawing the ends into engagement, and a guide for retaining the ends in alinement.

ALBERT N. COULSON.